(12) United States Patent
Dairman et al.

(10) Patent No.: US 8,786,633 B2
(45) Date of Patent: Jul. 22, 2014

(54) SYSTEM AND METHOD FOR DYNAMICALLY RENDERING BOUNDED REGION LABELS ON A MOVING MAP DISPLAY

(75) Inventors: Charles Dairman, Buckeye, AZ (US); Mark Pearson, Peoria, AZ (US)

(73) Assignee: Honeywell International, Inc., Morristown, NJ (US)

( * ) Notice: Subject to any disclaimer, the term of this patent is extended or adjusted under 35 U.S.C. 154(b) by 365 days.

(21) Appl. No.: 13/276,033

(22) Filed: Oct. 18, 2011

(65) Prior Publication Data
US 2013/0093794 A1    Apr. 18, 2013

(51) Int. Cl.
*G09G 5/00*    (2006.01)

(52) U.S. Cl.
USPC .......... 345/638; 345/672; 345/629; 340/995.1

(58) Field of Classification Search
CPC ............................ G01C 21/3673; G09B 29/10
USPC .......... 345/638, 629, 672; 701/460; 340/995.1
See application file for complete search history.

(56) References Cited

U.S. PATENT DOCUMENTS

| 6,626,955 | B1 | 9/2003 | Agrawal et al. |
|---|---|---|---|
| 6,665,840 | B1 * | 12/2003 | Wiley et al. ................... 715/234 |
| 6,714,196 | B2 | 3/2004 | McCormack et al. |
| 6,898,333 | B1 | 5/2005 | Gopalakrishnin et al. |
| 6,924,820 | B2 | 8/2005 | Ramani et al. |
| 7,234,106 | B2 | 6/2007 | Simske |
| 7,414,637 | B2 | 8/2008 | Fogel et al. |
| 7,425,968 | B2 | 9/2008 | Gelber |
| 7,542,882 | B2 | 6/2009 | Agrawala et al. |
| 7,554,462 | B2 | 6/2009 | Mori |
| 7,787,708 | B2 | 8/2010 | Scheidhauer et al. |
| 7,843,468 | B2 | 11/2010 | Crow et al. |
| 7,945,852 | B1 | 5/2011 | Pilskalns |
| 8,009,169 | B2 | 8/2011 | Diril et al. |
| 2004/0080434 | A1 * | 4/2004 | Watanabe et al. .......... 340/995.1 |
| 2005/0200501 | A1 | 9/2005 | Smith |
| 2007/0237382 | A1 | 10/2007 | Nuebling et al. |
| 2010/0280753 | A1 | 11/2010 | Chytil et al. |

FOREIGN PATENT DOCUMENTS

EP    2107543 A1 * 10/2009    ............. G09B 29/10

OTHER PUBLICATIONS

Ebinger, L. R. et al. "Automated Names Placement in a Non-Interactive Environment," Proc. Auto-Carto 9, 1989, pp. 205-214.

* cited by examiner

*Primary Examiner* — Maurice L McDowell, Jr.
(74) *Attorney, Agent, or Firm* — Ingrassia Fisher & Lorenz, P.C.

(57) ABSTRACT

Methods and apparatus are provided for dynamically rendering, on a moving map display having a viewable area, a label associated with a bounded region. Moving map data are processed to determine if the bounded region has a viewable boundary, and to determine a perimeter of one or more polygons that are each defined by intersections of the viewable boundary of the bounded region and the viewable area. Commands are supplied to the moving map display that cause the moving map display to continuously render the label associated with the bounded region at a position within the one or more polygons that is closest to a predetermined point on the moving map display.

10 Claims, 7 Drawing Sheets

SYSTEM AND METHOD FOR DYNAMICALLY RENDERING BOUNDED REGION LABELS ON A MOVING MAP DISPLAY

TECHNICAL FIELD

The present invention generally relates to moving map displays, and more particularly relates to dynamically rendering bounded region labels on a moving map display.

BACKGROUND

In the world of aviation, pilot situational awareness can be of paramount importance. Pilot awareness of various regions that have defined boundaries provides insight into transitions between, for example, air traffic control (ATC) sectors, position reporting locations, controlled and restricted airspace, Air Defense Identification Zones, geo-political boundaries, and more. As these regions move from only being available in static maps (e.g. paper charts or maps) to being digitally displayed using automated cartography (e.g., moving maps), it is becoming increasingly important to not only draw the defined boundaries clearly, but to render the identifying label associated with each region in a manner that that it is relatively easy for the pilot to identify.

Presently, there are many known methods that may be used to place identifying labels within bounded regions on a static map display. These methods may not translate well to moving map displays. For example, with a moving map display, such as a cockpit navigation display, the visible areas of the bounded regions on the display may change with aircraft movement. Another issue associated with identifying label placement on a moving map is that some methods may involve relatively intensive real-time processing. In some environments, this can undesirably slow processing time for other resources.

Hence, there is a need for a system and method for dynamically rendering bounded region labels on a moving map such that labels are rendered at a meaningful position where pilots can easily distinguish the bounded regions being displayed and without having to re-center or adjust the map range. There is additionally a need for a system and that strikes a balance between accuracy and real-time processing intensity. The present invention addresses one or more of these needs.

BRIEF SUMMARY

In one example embodiment, a method for dynamically rendering, on a moving map display having a viewable area, a label associated with a bounded region includes processing moving map data to determine if the bounded region has a viewable boundary. The moving map data are processed to determine a perimeter of one or more polygons that are each defined by intersections of the viewable boundary of the bounded region and the viewable area. Commands are supplied to the moving map display that cause the moving map display to continuously render the label associated with the bounded region at a position within the one or more polygons that is closest to a predetermined point on the moving map display.

In another example embodiment, a system for dynamically rendering a label associated with a bounded region includes a moving map display and a processor. The moving map display has a viewable area and is coupled to receive image rendering display commands. The moving map display is configured, in response to the image rendering display commands, to render images thereon. The processor is coupled to the moving map display and is adapted to receive moving map data. The processor is configured, upon receipt of the moving map data, to supply image rendering display commands to the moving map display that causes the moving map display to render an image of a moving map. The processor is further configured to determine if the rendered moving map includes a bounded region and, if so, determine if the bounded region has a viewable boundary, determine a perimeter of one or more polygons that are each defined by intersections of the viewable boundary of the bounded region and the viewable area, and supply image rendering display commands to the moving map display that causes the moving map display to continuously render the label associated with the bounded region at a position within the one or more polygons that is closest to a predetermined point on the moving map display.

In yet another example embodiment, a method for dynamically rendering, on a moving map display having a viewable area, a label associated with a bounded region includes processing data to determine if the bounded region has a viewable boundary. Data are processed to determine a perimeter of one or more polygons that are each defined by intersections of the viewable boundary of the bounded region and the viewable area. Data are processed to determine a largest area of the one or more polygons. Commands are supplied to the moving map display that cause the moving map display to render the label at a position within the largest area of the one or more polygons.

Furthermore, other desirable features and characteristics of the bounded region labeling system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description. In this regard, while embodiments are described, for convenience, as being implemented in an aircraft, it will be appreciated that the systems and methods described herein may be implemented in any one of numerous other vehicles, including watercraft, spacecraft, and automobiles, just to name a few.

Figure 1:
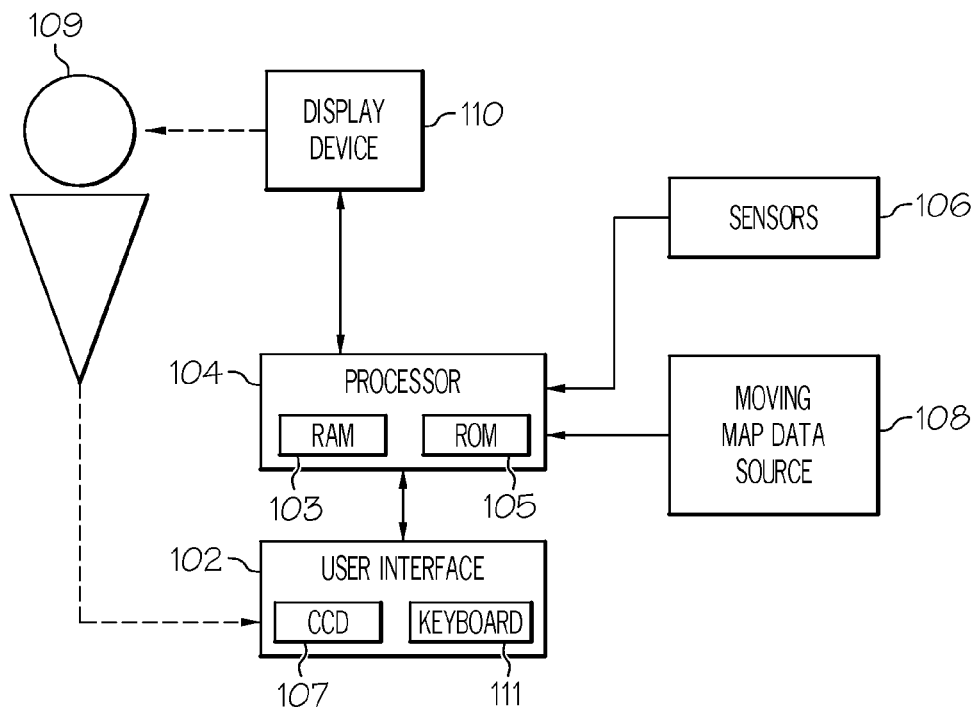
FIG. 1 depicts a functional block diagram of an embodiment of an aircraft flight deck display system.

Referring to FIG. 1, an embodiment of a flight deck display system is depicted and includes a user interface 102, a processor 104, various sensors 106, a moving map data source 108, and a display device 110. The user interface 102 is in operable communication with the processor 104 and is configured to receive input from a user 109 (e.g., a pilot) and, in response to the user input, supply command signals to the processor 104. The user interface 102 may be any one, or combination, of various known user interface devices including, but not limited to, a cursor control device (CCD) 107, such as a mouse, a trackball, or joystick, and/or a keyboard, one or more buttons, switches, or knobs. In the depicted embodiment, the user interface 102 includes a CCD 107 and a keyboard 111. The user 109 uses the CCD 107 to, among other things, move a cursor symbol on the display screen (see FIG. 2), and may use the keyboard 111 to, among other things, input textual data.

The processor 104 may be any one of numerous known general-purpose microprocessors or an application specific processor that operates in response to program instructions. In the depicted embodiment, the processor 104 includes on-board RAM (random access memory) 103, and on-board ROM (read only memory) 105. The program instructions that control the processor 104 may be stored in either or both the RAM 103 and the ROM 105. For example, the operating system software may be stored in the ROM 105, whereas various operating mode software routines and various operational parameters may be stored in the RAM 103. It will be appreciated that this is merely exemplary of one scheme for storing operating system software and software routines, and that various other storage schemes may be implemented. It will also be appreciated that the processor 104 may be implemented using various other circuits, not just a programmable processor. For example, digital logic circuits and analog signal processing circuits could also be used.

No matter how the processor 104 is specifically implemented, it is in operable communication with the moving map data source 108 and the display device 110, and is coupled to receive various types of inertial data from the various sensors 106. The processor 104 is configured, in response to the inertial data, to selectively retrieve data from the moving map data source 108 and to supply appropriate image rendering display commands to the display device 110. The display device 110, in response to the image rendering display commands, selectively renders various types of textual, graphic, and/or iconic information. The preferred manner in which the textual, graphic, and/or iconic information are rendered by the display device 110 will be described in more detail further below. Before doing so, however, a brief description of the sensors 106 and one embodiment of the moving map data source 108 will be provided.

The sensors 106 may be implemented using various numbers and types of inertial and positioning sensors, systems, and or subsystems, now known or developed in the future, for supplying various types of inertial data. The inertial data may also vary, but preferably include data representative of the location and state of the aircraft, including for example, aircraft speed, heading, altitude, and attitude.

The moving map data source 108 stores various types of moving map data. These data may vary, but in the depicted embodiment the moving map data includes terrain data and various types of navigation-related data. The terrain data are representative of the terrain over which the aircraft is traveling, either in-flight or on the ground. The navigation-related data include various flight plan related data such as, for example, waypoints, distances between waypoints, headings between waypoints, data related to different airports, navigational aids, obstructions, communication frequencies, and aircraft approach information, and data associated with various predefined bounded regions, such as special use airspace, controlled and restricted airspace, geo-political boundaries, air traffic control (ATC) sectors, etc. It will be appreciated that, although the moving map data source 108 is, for clarity and convenience, shown as being implemented separate from the processor 104, all or portions of the moving map data source 108 could be loaded into the RAM 103, or integrally formed as part of the processor 104, and/or RAM 103, and/or ROM 105. The moving map data source 108 could also be implemented as part of a device or system that is physically separate from the system 100. It will additionally be appreciated that one or more of the processor 104, the moving map data source 108, and the display device 110 could be implemented in a single device.

The display device 110, as noted above, in response to image rendering display commands supplied from the processor 104, selectively renders various textual, graphic, and/or iconic information, and thereby supply visual feedback to the user 109. It will be appreciated that the display device 110 may be implemented using any one of numerous known display devices suitable for rendering textual, graphic, and/or iconic information in a format viewable by the user 109. Non-limiting examples of such display devices include various cathode ray tube (CRT) displays, and various flat panel displays such as various types of LCD (liquid crystal display) and TFT (thin film transistor) displays. The display device 110 may additionally be implemented as a panel mounted display, a HUD (head-up display) projection, or any one of numerous known technologies. It is additionally noted that the display device 110 may be configured as any one of numerous types of aircraft flight deck displays that may implement the functionality of a moving map display. For example, the display device 110 may be configured as a multi-function display, a horizontal situation indicator, a vertical situation indicator, or a navigation display just to name a few.

Figure 2:
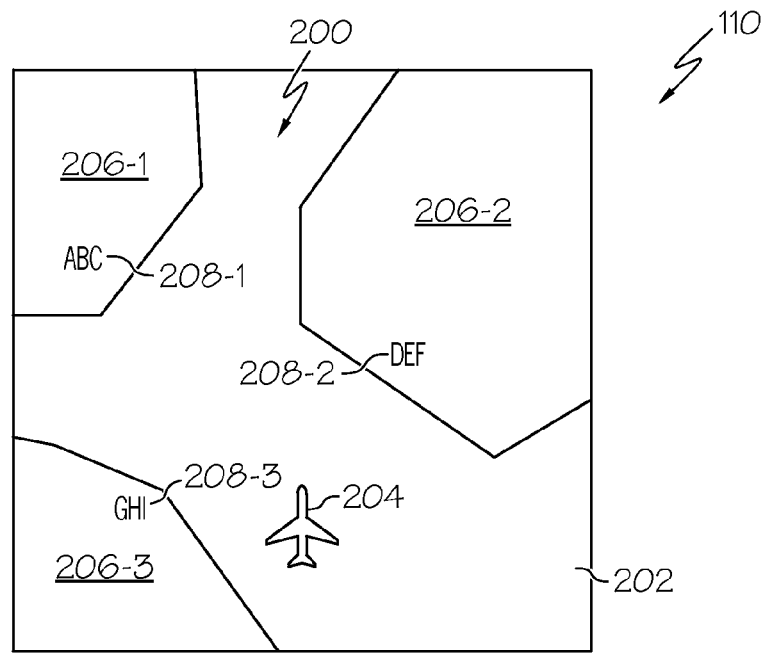
FIG. 2 depicts a simplified representation of a viewable display area for a moving map display that may be used in the system of FIG. 2.

No matter the specific display device 110 that is implemented, it is seen in FIG. 2 that the display 110 includes a viewable display area 200 in which, for example, a moving lateral map 202 may be rendered. In some implementations, the moving lateral map 202 may be rendered simultaneously with various other graphical and textual images. For example, a vertical profile and/or various flight-related data may also be rendered in the viewable display area. Nonetheless, the moving lateral map 202 may include a top-view aircraft symbol 204 and various predefined bounded regions 206 (206-1, 206-2, 206-3). Although three bounded regions 206 are depicted in FIG. 2, it will be appreciated that more or less than this number may be rendered in the viewable display area 200 depending, for example, on the location of the aircraft, and the scale of the rendered lateral map, etc. It will additionally be appreciated that various other map features may also be rendered in the viewable display area 200. These features may include, for example, terrain, navigation aids, one or more waypoint symbols, line segments that interconnect the waypoint symbols, and one or more range rings. However, for clarity and ease of depiction, these additional features are not depicted in FIG. 2.

As FIG. 2 also depicts, a label 208 (208-1, 208-2, 208-3) associated with each of the rendered bounded regions 206 is also rendered in the viewable display area 200. The labels 208 are each rendered within its associated bounded region 206, and at a position that is determined in accordance with a process that is implemented by the system 100. The process, various embodiments of which will now be described, ensures that the labels 208 are rendered at a position where the user 109 can easily distinguish the bounded regions 206 without having to re-center or adjust the map range, and does so with relatively low intensity real-time processing.

Figure 3:
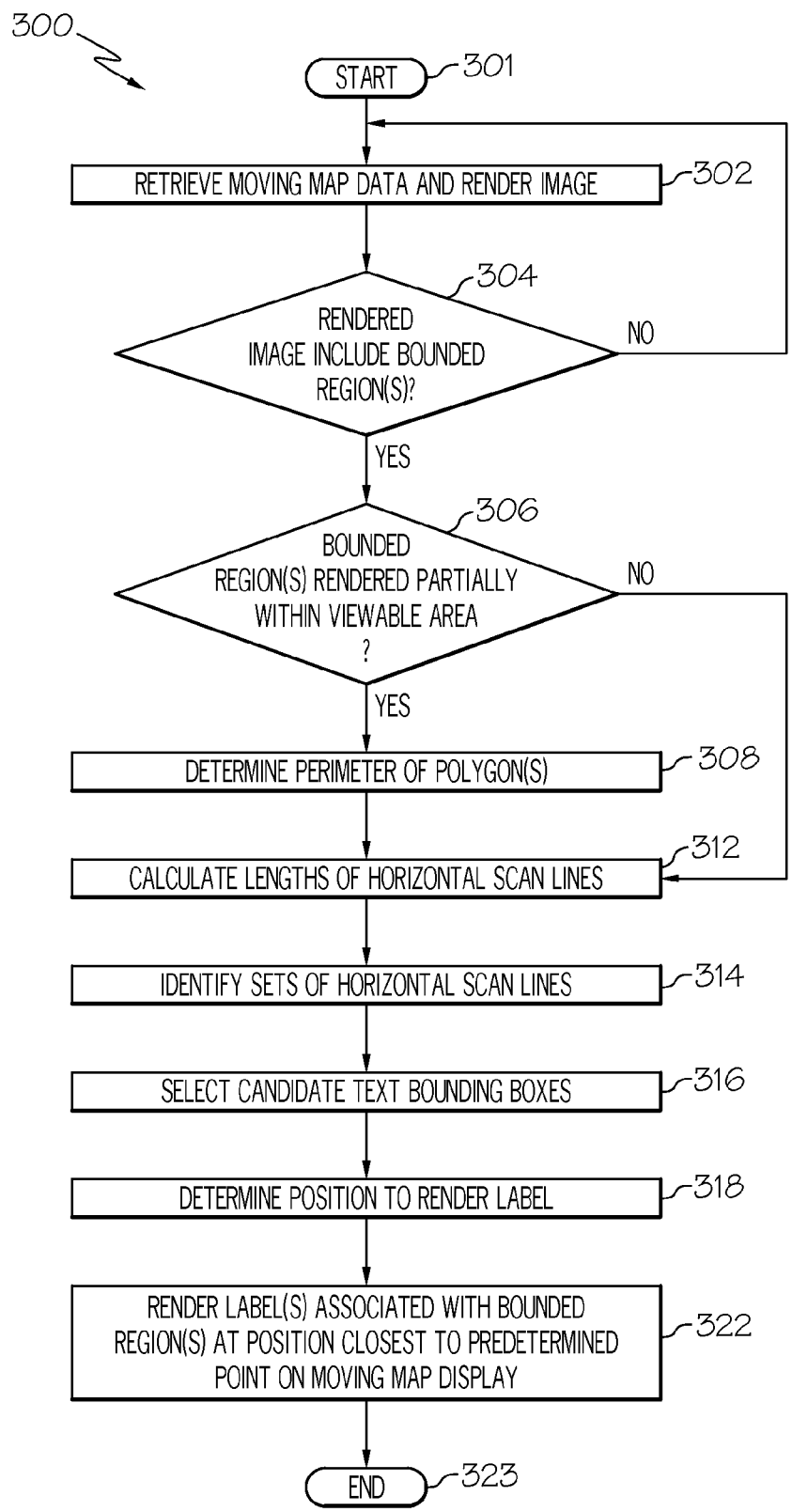
FIG. 3 depicts a process, in flowchart form, that may be implemented by the system in FIG. 1 for rendering labels associated with bounded regions in a display area.

The process 300, which is depicted in flowchart form in FIG. 3, begins by the processor 104 retrieving moving map data from the moving map data source 108 and, upon receipt thereof, supplies image rendering display commands to the moving map display 110 to render an image of a moving map (302). The processor 104 also processes the retrieved moving map data to determine if the moving map that is rendered in the viewable area 200 includes one or more bounded regions 206 (304). If so, the processor 104 determines which of the bounded regions 206 are rendered partially or entirely within the viewable area 200 (306).

Figure 4:
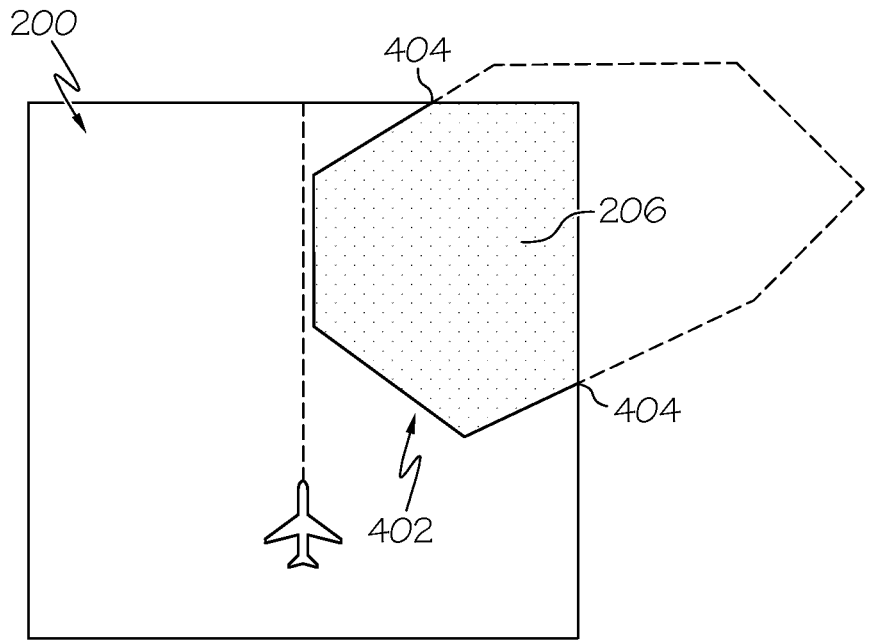
FIGS. 4 and 5 depict simplified representations of a viewable display area for a moving map display to illustrate various steps of the process depicted in FIG. 3.

For those bounded regions 206 that are rendered only partially within the viewable area 200, the processor 104 processes the moving map data to determine the perimeter of one or more polygons (308), which are defined by the intersection of a viewable boundary and the viewable area 200. This may be seen more readily by reference to FIG. 4, which, for ease of illustration and description, depicts a single bounded region 206 that is rendered only partially within the viewable area 200 of the moving map display 110. Here, there is only a single polygon 402, which is defined by the intersection 404 of the viewable boundary 406 and the viewable area 200.

Returning once again to FIG. 3, whether a bounded regions 206 is rendered partially or entirely within the viewable area 200, the processor 104 then supplies image rendering display commands to the moving map display 110 that cause the moving map display 100 to continuously render the label 208 associated with the bounded region 206 at a determined position on the moving map display (322). For the bounded regions that are rendered entirely within the viewable area 200, the determined position is a set, predetermined position such as, for example, the center of the bounded region 206. For the bounded regions 206 that are rendered only partially within the viewable area 200, the processor 104 implements additional processing to determine this position. One embodiment of this additional processing will now be described. Before doing so, however, it is noted that the predetermined point on the moving map display 110, as will be discussed further below, may vary.

Figure 5:
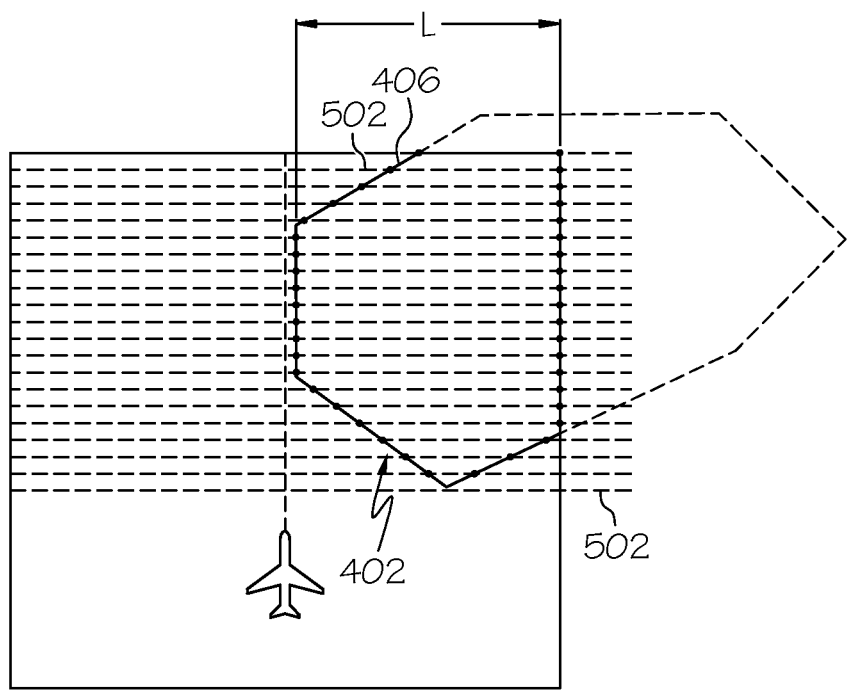
Figure 6:
FIGS. 6 and 7 depict different examples of horizontal scan line spacing relative to text height.
Figure 7:

This additional processing includes the processor 104 calculating the lengths of parallel horizontal scan lines that intersect the perimeter of each of the polygons (312). More specifically, as depicted in FIG. 5, the processor calculates the length (L) of each horizontal scan line 502 between the point where the horizontal scan line 502 intersects the perimeter 406 of the polygon 402 and where it intersects the viewable area 200. It will be appreciated that the spacing between each horizontal scan line 502, and thus the number of horizontal scan lines 502, may vary. Preferably, the spacing is based on the height of the text used to render the labels 208, while striking a balance between accuracy and performance. For example, a spacing of one-fourth the text height (H), as depicted in FIG. 6, would provide greater accuracy and resolution than a spacing of one-half the text height (H), as depicted in FIG. 7.

Figure 8:
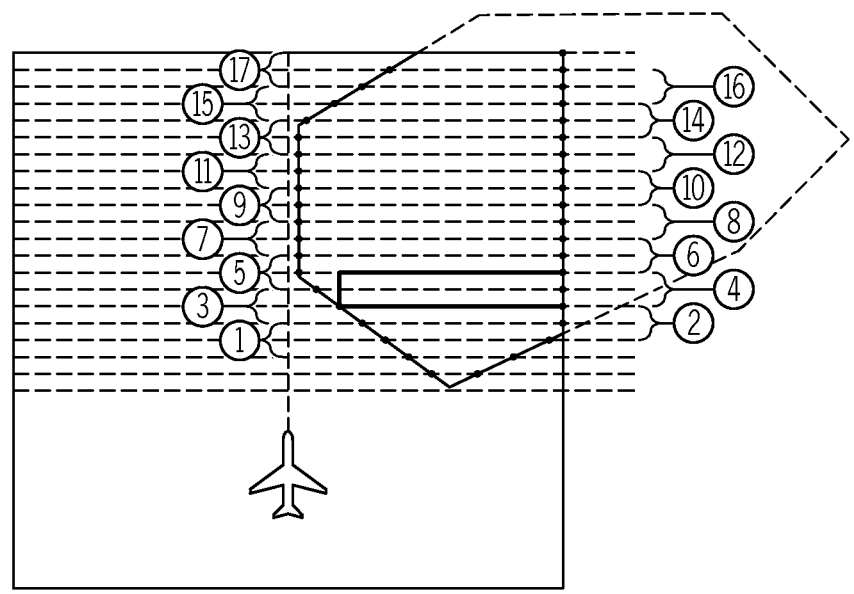
FIGS. 8-12 depict simplified representations of a viewable display area for a moving map display to illustrate various steps of the process depicted in FIG. 3.

Referring once again to FIG. 3, the processor 104, after calculating the lengths (L) of the parallel horizontal scan lines 502, identifies one or more sets of consecutive horizontal scan lines that meet at least two criteria (314). The first criterion is that the lines in each set are sufficient to at least span the text height (H). Thus, as indicated above, the number of consecutive scan lines in each set may vary. For the embodiments depicted in FIGS. 6 and 7, the number of scan lines in each set would be five and three, respectively. The second criterion is that the minimum length of the lines that comprise the set is greater than or equal to the length of the text. For the example depicted in FIG. 8, in which the spacing of the horizontal scan lines 502 is on-half the text height, the processor 104 identified 17 sets of consecutive horizontal scan lines 502.

Figure 9:
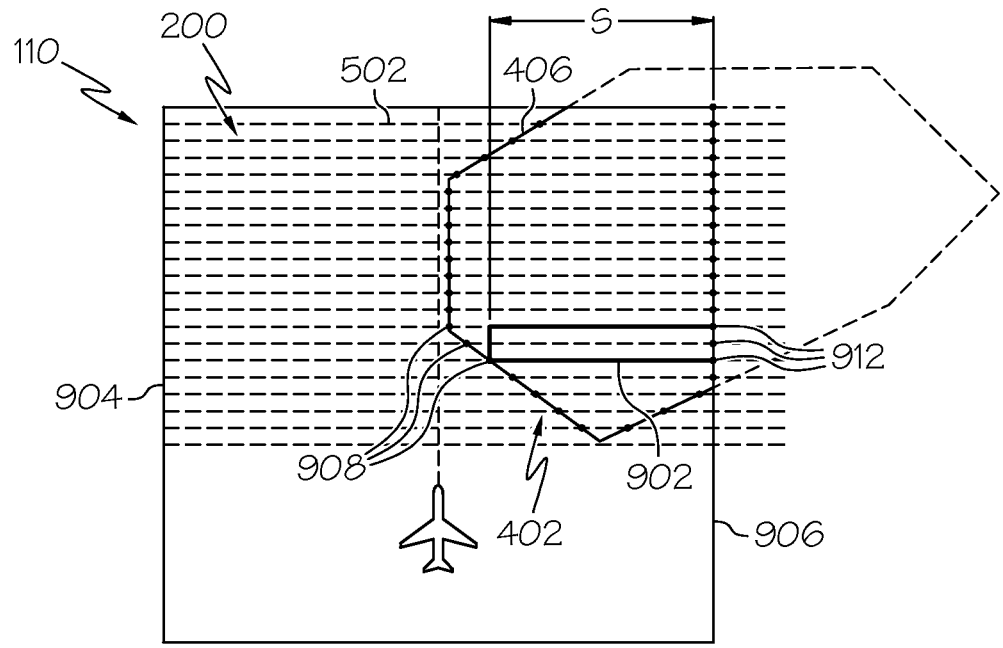

After the sets of consecutive horizontal scan lines 502 are identified (314), each is selected as candidate text bounding boxes (316) having a defined horizontal span. As shown in FIG. 9, which for clarity depicts only one of the 17 candidate text bounding boxes, the horizontal span (S) of each candidate text bounding box 902 is the maximum horizontal span of all of the horizontal scan lines in the set. To determine this, one of the edges 904 of the viewable display area 200 is defined as an origin edge. In the depicted embodiment, the left edge is selected, though the right edge 906 could also be selected. In either case, it is also seen that each of the horizontal scan lines 502 intersects the perimeter 406 of the polygon 402 at a start point 908 and at an end point 912. The horizontal span (S) of each candidate text bounding box 902 is then determined to be the maximum distance of each start point 908 and the minimum distance of each end point 912, from the origin edge 904, of the horizontal scan lines 502 in the associated set.

Figure 10:
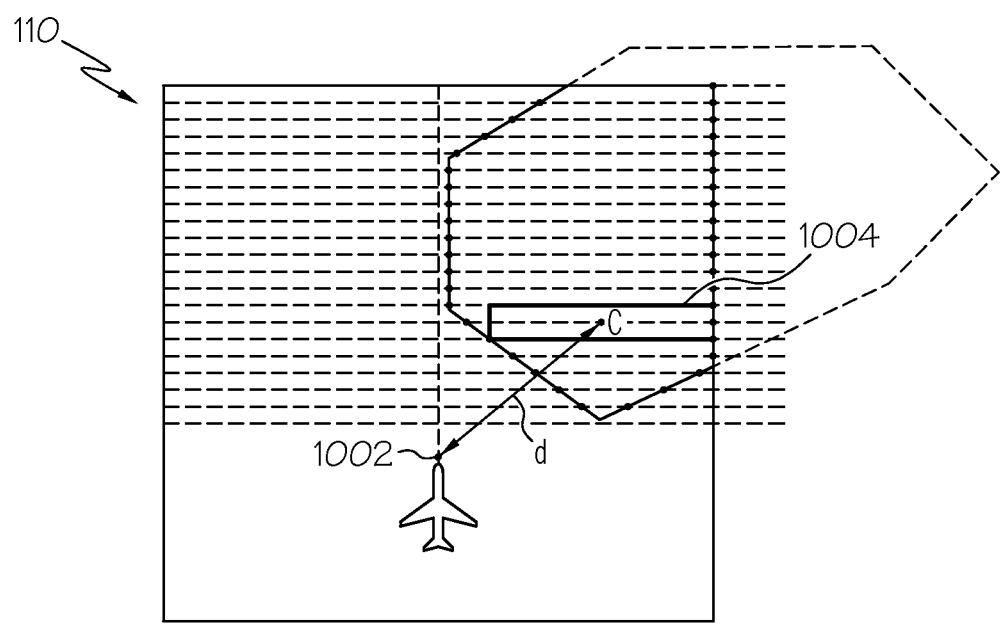

Returning once again to FIG. 3, after each of the candidate text bounding boxes 902 are selected, processor 104 then determines the position within the polygon 402 where the label 208 will be rendered (318). This position may be determined in accordance with one of two different methods. One method, which is illustrated in FIG. 10, includes calculating the straight-line distance (d) from the predetermined point 1002 on the moving map display 110 to the center (C) of each candidate text bounding box 1004 (for clarity, only one is depicted in FIG. 10), and determining which of the calculated straight-line distances is the shortest. The processor 104 will then supply image rendering display commands to the moving map display 110 that cause the moving map display 110 to render the label 208 in the center (C) of the candidate text bounding box 902 associated with the smallest distance, and such that the center of the rendered label 208 corresponds to the center of the candidate text bounding box 902.

Figure 11:
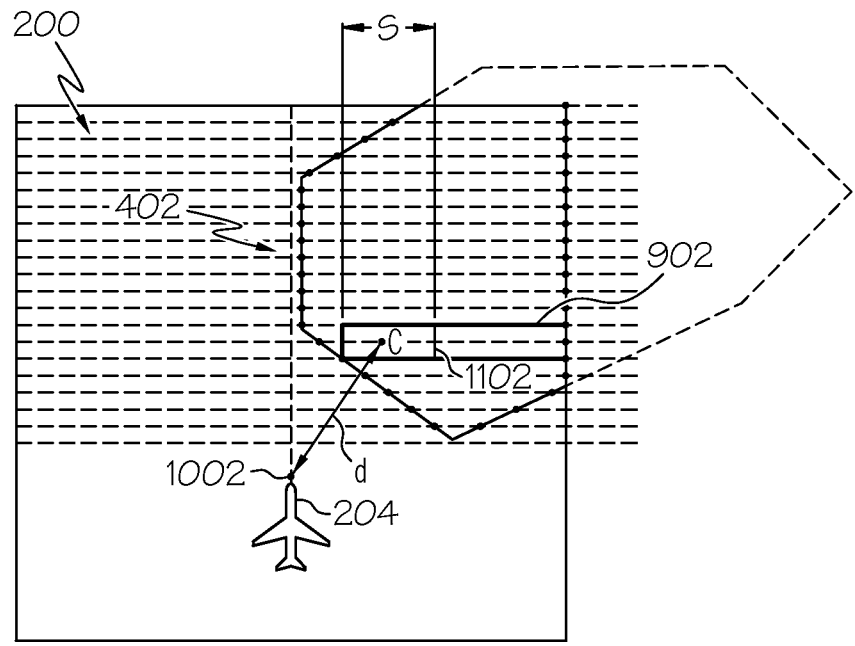

The second method of determining the label rendering position is illustrated in FIG. 11, and includes first defining shifted text bounding boxes 1102 (again, for clarity, only one is depicted in FIG. 11). A shifted text bounding box 1102 is defined by reducing the horizontal span (S) of a candidate text bounding box 902 to the minimum span need to fully render the label 208. Thereafter, the processing is similar to that described above, and includes calculating the straight-line distance (d) from the predetermined point 1002 on the moving map display 110 to the center (C) of each shifted text bounding box 1102, and determining which of the calculated straight-line distances is the shortest. The processor 104 will then supply image rendering display commands to the moving map display 110 that cause the moving map display 110 to render the label 208 in the center (C) of the shifted text bounding box 1102 associated with the smallest distance, and such that the center of the rendered label 208 corresponds to the center of the shifted text bounding box 1102.

An example of how the system 100 may implement the label placement process 300 described above is illustrated in FIG. 12, which depicts a plurality of bounded regions 206, each of which is only partially rendered in the viewable area 200. In this illustrative example, the bounded regions 206 are each flight information regions (FIRs), and thus include appropriate labels 208. It is further noted that the illustrative example is for a system 100 implementing the method of defining shifted text bounding boxes (described immediately above), and wherein the predetermined point 1202 on the moving map display 110 is just behind the top-down aircraft symbol 204.

Figure 12:
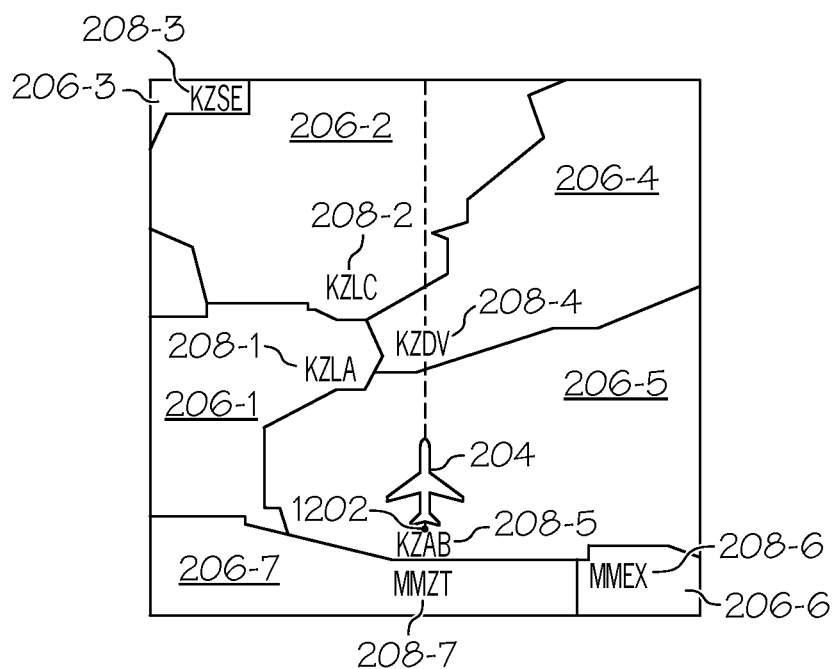

Before proceeding, it was previously noted that the predetermined point on the moving map display 110 may vary. In the example depicted in FIGS. 10 and 11, the predetermined point is just in front of the top-down aircraft symbol 204. As just noted, the predetermined point for the example depicted in FIG. 12 is just behind the top-down aircraft symbol 204. It will be appreciated that in other embodiments the predetermined point may the center of the viewable area 200, or any one of numerous other points in the viewable area 200.

Figure 13:
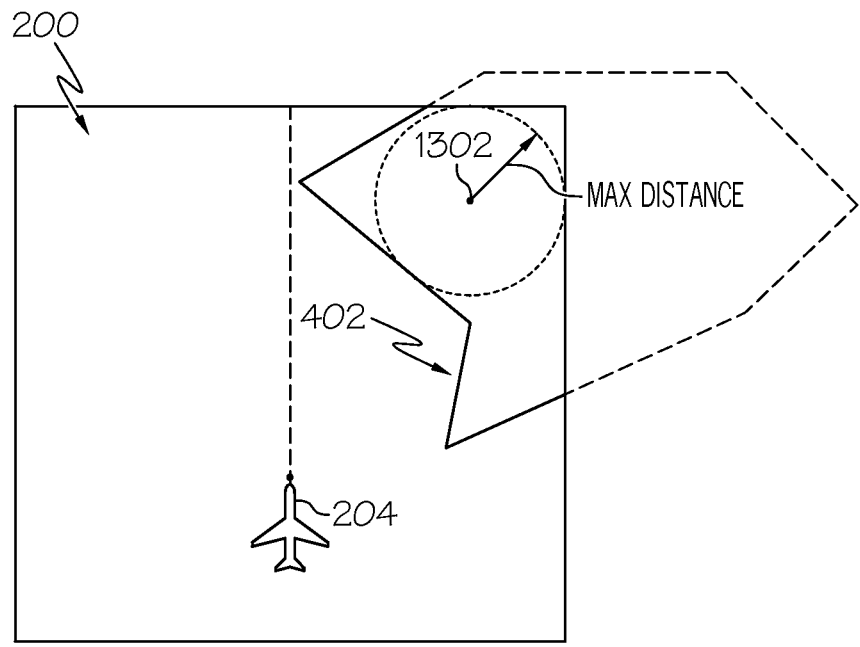
FIGS. 13 and 14 depict simplified representations of a viewable display area for a moving map display to illustrate various steps of an alternate process for rendering labels associated with bounded regions.
Figure 14:
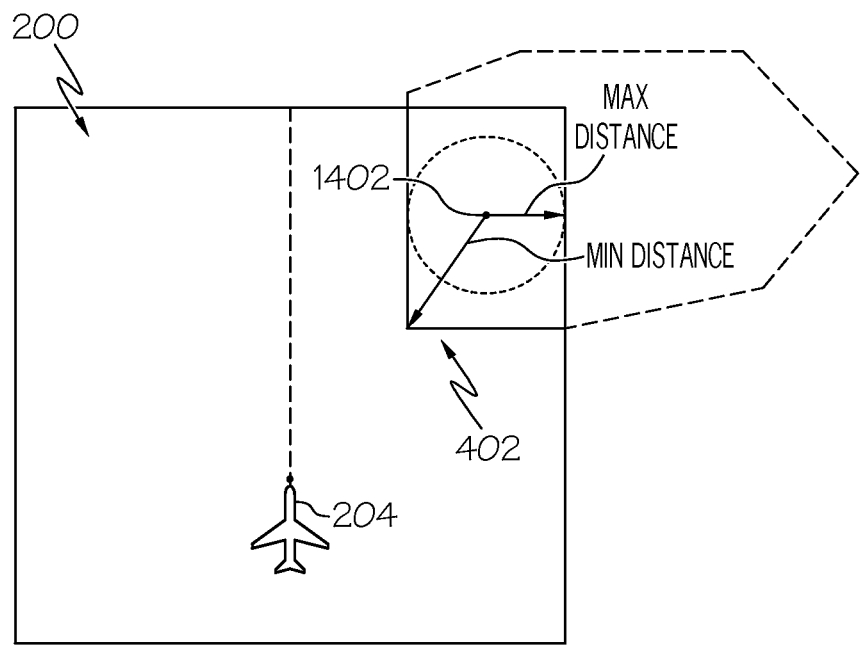

The label placement process 300 described above is merely exemplary of one process. Another exemplary label placement process, which will now be briefly described, places the label 208 in the center of the largest visible area of the rendered boundary region 206. As depicted in FIG. 13, this may be done by heuristically determining the point 1302 in the polygon 402 that is the furthest away from all of the sides that define the polygon 402. This could be done using one or more of the existing algorithms which are already used for such cases. For those instances in which multiple points may be equidistantly displaced from the sides of the polygon 402, such as in the example depicted in FIG. 14, the point whose maximum distance to a side of the polygon 402 is minimal would be selected as the label placement point 1402.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for dynamically rendering a label associated with a bounded region, the label having a text height and a text length comprising:

a moving map display having a viewable area and coupled to receive image rendering display commands, the moving map display configured, in response to the image rendering display commands, to render images thereon; and a processor coupled to the moving map display and adapted to receive moving map data, the processor configured, upon receipt of the moving map data, to supply image rendering display commands to the moving map display that cause the moving map display to render an image of a moving map, the processor further configured to:

determine if the rendered moving map includes a bounded region and, if so, determine if the bounded region has a viewable boundary, a viewable boundary being one that is rendered on the viewable area of the moving map display, determine a perimeter of one or more polygons, each polygon defined by intersections of the viewable boundary of the bounded region and the viewable area, calculate a length of each of a predetermined number of parallel horizontal scan lines that intersect the perimeter of each of the one or more polygons, identify sets of consecutive horizontal scan lines that (i) are sufficient to span the text height, (ii) have a minimum length greater than or equal to the text length, and (iii) are spaced apart from each other by a separation distance that is based upon the text height, select each of the identified sets of consecutive horizontal scan lines as candidate text bounding boxes, define the horizontal span of each of the candidate text bounding boxes, calculate a straight-line distance from a predetermined point on the moving map display to a center of each candidate text bounding box, determine which of the calculated straight-line distances is smallest distance, and supply image rendering display commands to the moving map display that cause the moving map display to render the label in the center of the candidate text bounding box associated with the smallest distance, such that a center of the rendered label corresponds to the center of the candidate text bounding box.

2. The system of claim 1, wherein the moving map display is disposed in a vehicle.

3. The system of claim 2, wherein the vehicle is an aircraft.

4. The system of claim 2, wherein the vehicle is an automobile.

5. The system of claim 2, wherein the vehicle is a watercraft.

6. A system for dynamically rendering a label associated with a bounded region, the label having a text height and a text length comprising:

a moving map display having a viewable area and coupled to receive image rendering display commands, the moving map display configured, in response to the image rendering display commands, to render images thereon; and a processor coupled to the moving map display and adapted to receive moving map data, the processor configured, upon receipt of the moving map data, to supply image rendering display commands to the moving map display that cause the moving map display to render an image of a moving map, the processor further configured to:

determine if the rendered moving map includes a bounded region and, if so, determine if the bounded region has a viewable boundary, a viewable boundary being one that is rendered on the viewable area of the moving map display, determine a perimeter of one or more polygons, each polygon defined by intersections of the viewable boundary of the bounded region and the viewable area, calculate a length of each of a predetermined number of parallel horizontal scan lines that intersect the perimeter of each of the one or more polygons, each of the predetermined number of parallel horizontal scan lines intersecting the perimeter of each of the one or more polygons at a start point and an end point, define an edge of the viewable display area as an origin edge, determine a distance of the start point and the end point of each of the predetermined number of parallel horizontal scan lines from the origin edge, define the horizontal span of each candidate text bounding box as (i) a maximum distance of each start point in the set of consecutive horizontal scan lines in each identified set and (ii) a minimum distance of each end point in the set of consecutive scan lines in each identified set, reduce the horizontal span of each candidate text bounding box to a minimum span within which the label may be fully rendered to thereby define shifted text bounding boxes, calculate a straight-line distance from the predetermined point on the moving map display to a center of each shifted text bounding box, determine which of the calculated straight-line distances is smallest distance; and supply image rendering display commands to the moving map display that cause the moving map display to render the label in the center of the shifted text bounding box associated with the smallest distance, such that a center of the rendered label corresponds to the center of the shifted text bounding box.

7. The system of claim 6, wherein the moving map display is disposed in a vehicle.

8. The system of claim 7, wherein the vehicle is an aircraft.

9. The system of claim 7, wherein the vehicle is an automobile.

10. The system of claim 7, wherein the vehicle is a watercraft.

* * * * *